United States Patent
Wakabayashi et al.

(10) Patent No.: US 9,741,466 B2
(45) Date of Patent: Aug. 22, 2017

(54) WATERPROOF STRUCTURE FOR STOPPING WATER BETWEEN BARE WIRES OF MULTIPLE CIRCUITS

(71) Applicant: SUMITOMO WIRING SYSTEMS, LTD., Mie (JP)

(72) Inventors: Masataka Wakabayashi, Mie (JP); Kazuto Hasegawa, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 39 days.

(21) Appl. No.: 14/661,587

(22) Filed: Mar. 18, 2015

(65) Prior Publication Data
US 2015/0279516 A1 Oct. 1, 2015

(30) Foreign Application Priority Data
Mar. 25, 2014 (JP) .................... 2014-062034

(51) Int. Cl.
*H02G 15/00* (2006.01)
*H01B 7/282* (2006.01)
(Continued)

(52) U.S. Cl.
CPC .............. *H01B 7/282* (2013.01); *H01R 4/184* (2013.01); *H01R 4/00* (2013.01); *H01R 4/14* (2013.01);
(Continued)

(58) Field of Classification Search
CPC ... H01R 4/10; H01R 4/14; H01R 4/16; H01R 4/22; H01R 4/66; H01R 4/72;
(Continued)

(56) References Cited

U.S. PATENT DOCUMENTS 1,577,123 A * 3/1926 Hunt ................. H01R 4/22
174/87
1,923,073 A * 8/1933 Brell ................. H01R 4/22
174/87
(Continued)

FOREIGN PATENT DOCUMENTS

JP 2006-81319 3/2006
JP 2008-131327 A * 6/2008 ............... H04B 3/02

OTHER PUBLICATIONS

U.S. Appl. No. 14/658,714 to Masataka Wakabayashi et al., filed Mar. 16, 2015.

*Primary Examiner* — William H Mayo, III
(74) *Attorney, Agent, or Firm* — Greenblum & Bernstein, P.L.C.

(57) ABSTRACT

A waterproof structure for stopping water between bare wires of multiple circuits stopping water between bare wires all together for plural covered wires each of which has a stripped wire exposed part formed by removing a cover material in an intermediate portion thereof, and is folded over at the stripped wire exposed part; a non-electrically conductive wire support supporting plural covered wires so as to prevent short-circuits between the stripped wire exposed parts of plural covered wires; a container accommodating portions of plural covered wires supported by the wire support and the stripped wire exposed part; and a thermosetting waterproofing agent filled into the container to immerse at least the stripped wire exposed parts of plural covered wires and cured to immerse the stripped wire exposed part and clearance between plural covered wires.

9 Claims, 10 Drawing Sheets

(51) Int. Cl.
*H01R 4/18* (2006.01)
*H01R 4/00* (2006.01)
*H01R 4/16* (2006.01)
*H01R 4/22* (2006.01)
*H01R 4/14* (2006.01)

(52) U.S. Cl.
CPC ............... *H01R 4/16* (2013.01); *H01R 4/22* (2013.01); *H02G 15/00* (2013.01)

(58) Field of Classification Search
CPC ........ H01R 4/184; H01R 4/185; H01R 11/01; H01R 11/12; H01R 13/40
USPC ..... 174/74 R, 76, 78–94 R, 94 S, 84 C, 84 S
See application file for complete search history.

(56) References Cited

U.S. PATENT DOCUMENTS

| | | | | |
|---|---|---|---|---|
| 2,416,943 A * | 3/1947 | Nicolazzo | H01R 4/22 | 174/87 |
| 2,870,239 A * | 1/1959 | Ustin | H01R 4/22 | 174/138 F |
| 3,083,260 A * | 3/1963 | Bird | H01R 4/22 | 174/84 R |
| 3,109,051 A * | 10/1963 | Vogel | H01R 4/22 | 174/84 R |
| 3,507,977 A * | 4/1970 | Pusey | H01R 4/00 | 174/110 PM |
| 3,597,528 A * | 8/1971 | Penfield | H01R 4/22 | 174/76 |
| 3,768,941 A * | 10/1973 | D'Ascoli | H01R 4/01 | 174/87 |
| 3,784,731 A * | 1/1974 | Newbold | H01R 4/22 | 174/84 C |
| 3,835,241 A * | 9/1974 | Masterson | H01R 4/188 | 174/84 C |
| 3,934,076 A * | 1/1976 | Smith | H02G 15/10 | 174/138 F |
| 3,937,870 A * | 2/1976 | Bumpstead | H02G 15/10 | 174/138 F |
| 3,985,951 A * | 10/1976 | Harris | H01B 7/2855 | 138/141 |
| 4,053,704 A * | 10/1977 | Smith | H02G 15/06 | 174/138 F |
| 4,065,637 A * | 12/1977 | Allison | H01R 4/2495 | 174/84 C |
| 4,070,543 A * | 1/1978 | Thompson | H02G 15/043 | 156/49 |
| 4,600,804 A * | 7/1986 | Howard | H01R 4/20 | 174/84 C |
| 4,721,832 A * | 1/1988 | Toy | H01R 4/70 | 156/49 |
| 4,751,350 A * | 6/1988 | Eaton | H02G 15/043 | 174/74 A |
| 4,783,227 A * | 11/1988 | Meador | H02G 15/003 | 156/294 |
| 6,051,791 A * | 4/2000 | King | H01R 4/12 | 174/87 |
| 6,730,847 B1 * | 5/2004 | Fitzgerald | H01R 4/22 | 174/74 R |
| 6,818,829 B1 * | 11/2004 | McMillan | H02G 15/076 | 174/74 R |
| 7,850,806 B2 * | 12/2010 | Kawakita | H01R 4/72 | 156/47 |
| 2006/0048965 A1* | 3/2006 | Ootsuki | H01R 4/22 | 174/74 A |
| 2007/0023199 A1* | 2/2007 | Bukovnik | H02G 15/043 | 174/77 R |

* cited by examiner

WATERPROOF STRUCTURE FOR STOPPING WATER BETWEEN BARE WIRES OF MULTIPLE CIRCUITS

TECHNICAL FIELD

The present invention relates to a waterproof structure for stopping water between bare wires of multiple circuits.

BACKGROUND ART

Conventionally, heat shrinkable tubes and thermosetting waterproofing agents are utilized as materials for waterproof structures of terminal splice parts of covered wires constituting a wire harness arranged in automobile. (See JP-2006-81319, for example)

FIG. 10 shows a waterproof structure of a terminal splice part described in JP-2006-81319. In FIG. 10, the waterproof structure of the terminal splice has a configuration, which is formed by welding a bare wire exposed part 101a exposed from the ends of a plurality of covered wires 101 to form a terminal splice part 101b, closing a bottom end of a tubular heat shrinkable tube 102a with a stopper 102b to form a container 102, accommodating the terminal splice part 101b within the container 102, filling a thermosetting waterproofing agent 103 into it, and then shrinking the container 102 by heating the entire container 102 while curing the thermosetting waterproofing agent 103.

JP 2006-81319A is an example of related art.

However, while such conventional waterproof structures of the terminal splice parts are capable of stopping water between bare wires with the shared terminal splice part 101b, they do not consider waterproofing between bare wires of multiple circuits.

One of the objects of the present invention is to solve the abovementioned problem, and provide a waterproof structure for stopping water between bare wires of multiple circuits that is capable of stopping water between bare wires all together for a plurality of covered wires constituting multiple circuits.

SUMMARY OF THE INVENTION

A waterproof structure for stopping water between bare wires of multiple circuits in the present invention comprises a plurality of covered wires each of which has a stripped wire exposed part formed by removing a cover material in an intermediate portion thereof and is folded over at the stripped wire exposed part; a non-electrically conductive wire support which supports the plurality of covered wires so as to prevent short-circuits between the stripped wire exposed parts of the plurality of covered wires; a container which accommodates the wire support, portions of the plurality of covered wires supported by the wire support and the stripped wire exposed parts; and a thermosetting waterproofing agent which is filled into the container so as to immerse at least the stripped wire exposed parts of the plurality of covered wires and cured while penetrating through clearances between the bare wires from the stripped wire exposed parts of the plurality of covered wires.

With this configuration, in the waterproof structure for stopping water between bare wires of multiple circuits according to the present invention, the thermosetting waterproofing agent filled into the container is cured to penetrate through clearances between the bare wires by capillary action from the stripped wire exposed parts of the plurality of covered wires supported by the wire support. Accordingly, the waterproof structure for stopping water between bare wires of multiple circuits according to the present invention is capable of stopping water between bare wires all together for the plurality of covered wires constituting multiple circuits with a single structure.

In the abovementioned waterproof structure for stopping water between bare wires of multiple circuits according to the above configuration, the container is preferably formed of a heat shrinkable tube having a closed end, and heated to have a form with a shrunk diameter after being filled with the thermosetting waterproofing agent.

With this configuration, in the waterproof structure for stopping water between bare wires of multiple circuits according to the present invention, the container has a form with a shrunk diameter, making it possible to reduce the size of a bump which is formed at a wire harness in accordance with the form of the container for the application to the wire harness, and prevents the interference between a bump and other members when laying out the wire harness.

In the abovementioned waterproof structure for stopping water between bare wires of multiple circuits, the container is preferably formed of a heat shrinkable tube, the container accommodating a stopper at one end, heated at the one end to shrink its diameter, closed with the stopper, filled with the thermosetting waterproofing agent and heated to have a form with a shrunk diameter over the entire length.

With this configuration, in the waterproof structure for stopping water between bare wires of multiple circuits according to the present invention, the container has a form with a shrunk diameter over the entire length, making it possible to reduce the size of a bump which is formed at a wire harness in accordance with the form of the container for the application to the wire harness, and prevents the interference between a bump and other members when laying out the wire harness.

In the abovementioned waterproof structure for stopping water between bare wires of multiple circuits, the wire support is preferably provided with a tubular part and a plurality of hook parts which are spaced apart from each other at a predetermined interval in a longitudinal direction of the tubular part and protrude radially outwardly in a radial direction from the tubular part, in which the plurality of covered wires are wound at the stripped wire exposed parts in loop forms and hooked to the tubular part of the wire support and supported by the hook parts of the wire support so as to prevent short-circuits between the stripped wire exposed parts.

In the abovementioned waterproof structure for stopping water between bare wires of multiple circuits, the wire support is preferably provided with a plurality of groove parts extending in parallel and hook parts protruding from bottom surfaces of the plurality of groove parts, wherein the plurality of covered wires are inserted into the groove parts of the wire support so as to prevent short-circuits between the stripped wire exposed parts, and wherein the stripped wire exposed part is wound in a loop form and hooked to the hook part of the wire support.

In the abovementioned waterproof structure for stopping water between bare wires of multiple circuits, the wire support is preferably provided with a planar plate part and a plurality of hook parts protruding from one side of the planar plate part so as to be formed into a pinholder shape, wherein the plurality of covered wires are wound in loop forms and hooked to the hook parts of the wire support so as to prevent short-circuits between the stripped wire exposed parts and clamped at portions adjacent to the stripped wire exposed parts with the predetermined adjacent hook parts in a radial direction of the wire.

In the abovementioned waterproof structure for stopping water between bare wires of multiple circuits, the wire support is preferably provided with a wire insertion part penetrating from one end to the other end, wherein the plurality of covered wires are inserted into the wire insertion part of the wire support and protrude outwardly from the wire support so as to prevent short-circuits between the stripped wire exposed parts.

According to the present invention, it is possible to provide a waterproof structure for stopping water between bare wires of multiple circuits capable of stopping water between bare wires all together for a plurality of covered wires constituting multiple circuits.

EMBODIMENTS OF THE INVENTION

Next, embodiments of a waterproof structure for stopping water between bare wires of multiple circuits according to the present invention will be described with reference to the drawings.

First Embodiment

Figure 1:
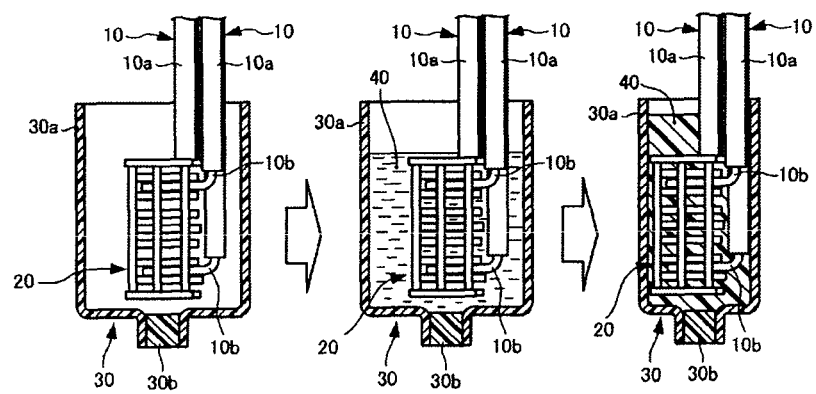
FIG. 1 is a schematic diagram showing a step of filling a thermosetting waterproofing agent into a container accommodating therein a wire support and intermediate parts in wire extending directions of a plurality of covered wires including stripped wire exposed parts and curing the same, in the waterproof structure for stopping water between bare wires of multiple circuits according to a first embodiment of the present invention.

As shown in FIG. 1, a waterproof structure for stopping water between bare wires of multiple circuits according to this embodiment is provided with a plurality of covered wires 10 constituting multiple circuits, a wire support 20 supporting each covered wire 10, a container 30 with a bottom which accommodates therein the wire support 20 and predetermined portions of the plurality of covered wires 10, and a thermosetting waterproofing agent 40 filled into the container 30.

Figure 2:
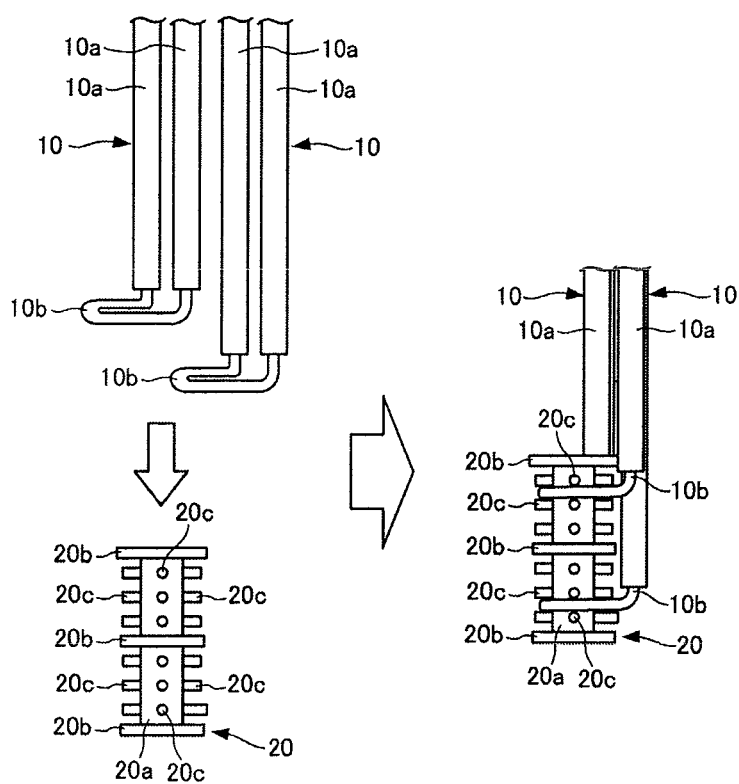
FIG. 2 is a schematic diagram showing a step of assembling a wire to the wire support, in the waterproof structure for stopping water between bare wires of multiple circuits according to the first embodiment of the present invention.

As shown in FIG. 2, each covered wire 10 has a stripped wire exposed part 10b formed by removing a cover material 10a in an intermediate portion thereof and is folded over at the stripped wire exposed part 10b.

Figure 3:
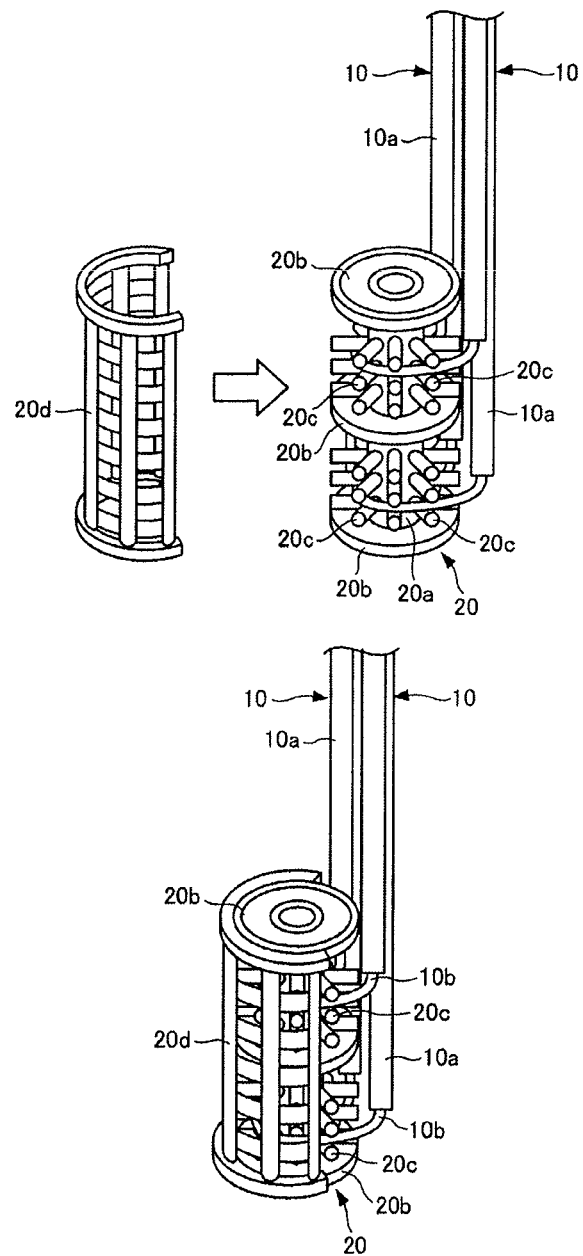
FIG. 3 is a perspective view showing a step of assembling a cover to a flange part of the wire support, in the waterproof structure for stopping water between bare wires of multiple circuits according to the first embodiment of the present invention.

As shown in FIG. 3, the wire support 20 is made of a non-electrically conductive material and provided with a tubular part 20a extending in the vertical direction, flange parts 20b formed at an intermediate part in vertical direction and at the lower end of the tubular part 20a, a plurality of rod-shaped hook parts 20c each of which protrudes radially outward in a radial direction from the tubular part 20a so as to be positioned between adjacent flange parts 20b, and a lattice-shaped cover 20d which is in contact with each flange part 20b in range exceeding a semiperimeter of an outer edge part of the flange part 20b and engages with each flange part 20b so as to cover a predetermined range of the tubular part 20a and predetermined hook parts 20c.

The stripped wire exposed part 10b of each covered wire 10 is wound in a loop form and hooked to the tubular part 20a of the wire support 20. Each covered wire 10 is supported by a predetermined hook part 20c so as to prevent short-circuits between the stripped wire exposed parts 10b, and protected by the cover 20d so as to prevent the stripped wire exposed part 10b from coming off from the hook parts 20c.

As shown in FIG. 1, the container 30 is provided with a vertically extending heat shrinkable tube 30a and a stopper 30b accommodated at a lower end of the heat shrinkable tube 30a. One end of the heat shrinkable tube 30a is heated to shrink its diameter and closed with the stopper 30b. The container 30 is arranged to accommodate therein the wire support 20, the portions of the plurality of covered wires 10 that are supported by the wire support 20 and the stripped wire exposed part 10b.

A two-liquid epoxy waterproofing agent is preferably selected as the thermosetting waterproofing agent 40. A two-liquid epoxy waterproofing agent is composed of a main agent and a curing agent. It is filled into the container 30 to immerse the wire support 20, the portions of the plurality of covered wires 10 that are supported by the wire support 20 and the stripped wire exposed part 10b. The two-liquid epoxy waterproofing agent is then cured while immersing the stripped wire exposed part 10b of the plurality of covered wires 10 and penetrating through the clearances between the bare wires by capillary action.

For the purpose of stopping water between bare wires of the plurality of covered wires 10 constituting multiple circuits, as shown in FIG. 2, the stripped wire exposed part 10b of each covered wire 10 is wound in a loop form, hooked to the tubular part 20a of the wire support 20, and supported by a predetermined hook part 20c so as to prevent short-circuits.

As shown in FIG. 3, the lattice-shaped cover 20d is engaged with each flange part 20b to cover therewith a predetermined region of the tubular part 20a and predetermined hook parts 20c, preventing the stripped wire exposed parts 10b of each covered wire 10 from coming off from the hook parts 20c.

Next, as shown in FIG. 1, the wire support 20, the portions of the plurality of covered wires 10 supported by the wire support 20 and the stripped wire exposed parts 10b are accommodated within the container 30. In this configuration, the covered wires 10 are supported by a fixture or jig (not shown) outside of the container 30 while the lower end of the wire support 20 is spaced apart from an interior bottom part of the container 30 with a predetermined interval.

Then, an uncured thermosetting waterproofing agent 40 is filled into the container 30 so as to immerse the wire support 20, the portions of the plurality of covered wires 10 supported by the wire support 20 and the stripped wire exposed parts 10b, penetrating through clearances between the bare wires from the stripped wire exposed parts 10b of the plurality of covered wires 10 by capillary action.

Furthermore, the whole container 30 is heated up to a predetermined temperature to shrink its diameter by heat shrinkage, thermally curing the thermosetting waterproofing agent 40 in the container 30 and the thermosetting waterproofing agent 40 penetrating through the clearances between bare wires of the covered wires 10.

In the waterproof structure for stopping water between bare wires of multiple circuits according to this embodiment, the thermosetting waterproofing agent 40 filled into the container 30 is cured while penetrating through the clearances between bare wires of the covered wires 10 by capillary action from the stripped wire exposed parts 10b of the plurality of covered wires 10 supported by the wire support 20. Therefore, the waterproof structure for stopping water between bare wires of multiple circuits according to this embodiment enables waterproofing between bare wires all together for the plurality of covered wires 10 constituting multiple circuits.

In the waterproof structure for stopping water between bare wires of multiple circuits according to this embodiment, the container 30 has a diameter that is overall shrunk by heat shrinkage. Therefore, when applied to a wire harness, the waterproof structure for stopping water between bare wires of multiple circuits according to this embodiment makes it possible to reduce the size of a bump formed in a wire harness in accordance with the form of the container 30, for example, as well as preventing the interference between the bump and other members when laying out the wire harness.

Second Embodiment

Figure 4:
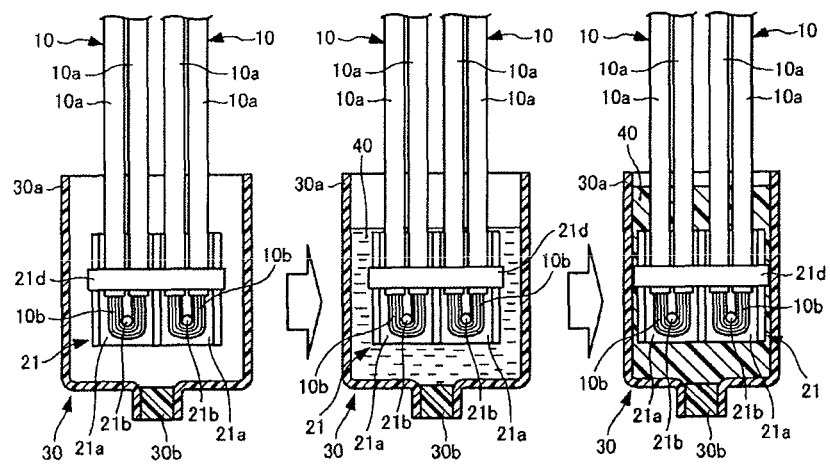
FIG. 4 is a schematic diagram showing a step of filling a thermosetting waterproofing agent into a container accommodating therein a wire support and intermediate parts in wire extending directions of a plurality of covered wires including stripped wire exposed parts and curing the same, in the waterproof structure for stopping water between bare wires of multiple circuits according to a second embodiment of the present invention.

As shown in FIG. 4, the waterproof structure for stopping water between bare wires of multiple circuits according to this embodiment is provided with the plurality of covered wires 10 constituting multiple circuits, a wire support 21 supporting each covered wire 10, a container 30 with a bottom which accommodates therein the wire support 21 and predetermined portions of the plurality of covered wires 10, and a thermosetting waterproofing agent 40 filled into the container 30. The covered wire 10 and the container 30 have the same structures as those shown in FIG. 1, and will not be explained in detail.

Figure 5:
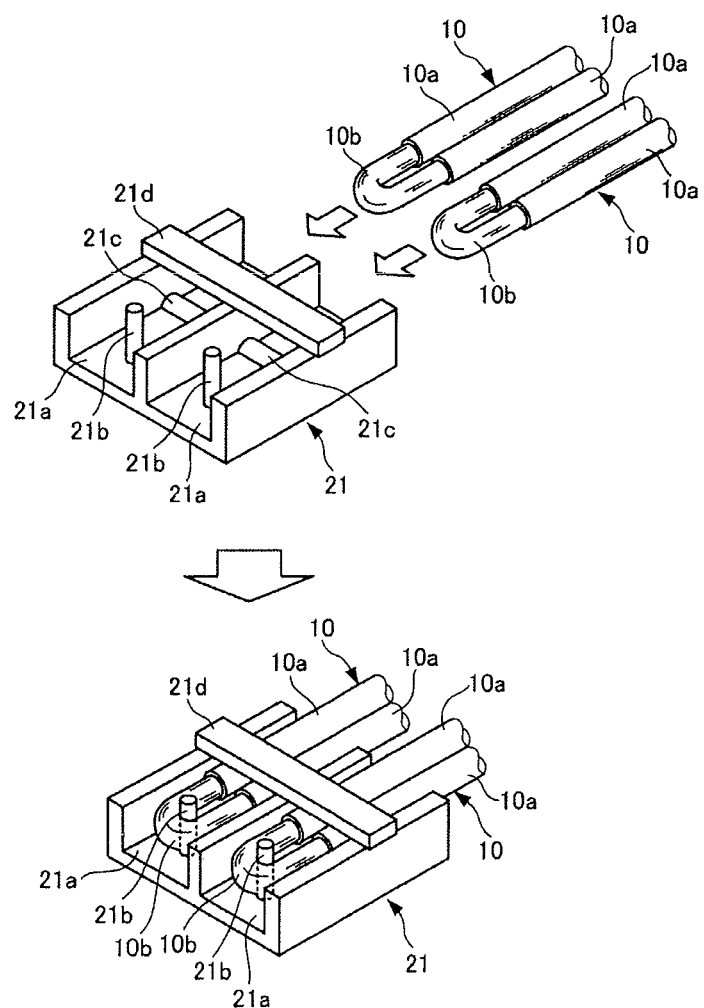
FIG. 5 is a perspective view showing a step of assembling a cover to a flange part of the wire support, in the waterproof structure for stopping water between bare wires of multiple circuits according to the second embodiment of the present invention.

As shown in FIG. 5, the wire support 21 is made of a non-electrically conductive material and provided with a plurality of groove parts 21a extending in parallel, rod-shaped hook parts 21b protruding in a direction perpendicular to the direction in which the groove part extends from a bottom surface of the groove parts 21a, convex curved parts 21c projecting from the bottom surface of the groove parts 21a, and a holding part 21d which faces each convex curved part 21c with an interval.

Each covered wire 10 is inserted into a corresponding groove part 21a of the wire support 21 so as to prevent short-circuits between the stripped wire exposed parts 10b. The stripped wire exposed parts 10b are wound in loop forms and hooked to the hook parts 21b of the wire support 21. The portions adjacent to the stripped wire exposed parts 10b in each covered wire 10 are clamped in a radial direction of the wires with the convex curved part 21c and the holding part 21d of the wire support 21.

For the purpose of stopping water between bare wires of the plurality of covered wires 10 constituting multiple circuits, as shown in FIG. 5, each covered wire 10 is inserted into the corresponding groove part 21a of the wire support 21 while its stripped wire exposed part 10b is wound in a loop form and hooked to the hook part 21b of the wire support 21.

Then, as shown in FIG. 4, the wire support 21, the portions of the plurality of covered wires 10 supported by the wire support 21 and the stripped wire exposed part 10b are accommodated within the container 30. At that time, the covered wires 10 are supported by a fixture or jig (not shown) outside of the container 30 to keep a predetermined interval between the interior bottom of the container 30 and the lower end of the wire support 21.

Subsequently, an uncured thermosetting waterproofing agent 40 is filled into the container 30 so as to immerse the wire support 21, the portions of the plurality of covered wires 10 supported by the wire support 20 and the stripped wire exposed parts 10b, penetrating through the clearances between bare wires from the stripped wire exposed parts 10b of the plurality of covered wires 10 by capillary action.

Furthermore, the entire container 30 is heated up to a predetermined temperature to shrink its diameter by heat shrinkage, thermally curing the thermosetting waterproofing agent 40 in the container 30 and the thermosetting waterproofing agent 40 penetrating through the clearances between the bare wires of the covered wires 10.

In the waterproof structure for stopping water between bare wires of multiple circuits according to this embodiment, the thermosetting waterproofing agent 40 filled into the container 30 is cured while penetrating through the clearances between bare wires of the covered wires 10 by capillary action from the stripped wire exposed parts 10b of the plurality of covered wires 10 supported by the wire support 21. Therefore, the waterproof structure for stopping water between bare wires of multiple circuits according to this embodiment enables waterproofing between bare wires for all of the plurality of covered wires 10 constituting multiple circuits.

In the waterproof structure for stopping water between bare wires of multiple circuits according to this embodiment, the container 30 has a diameter that is overall shrunk by heat shrinkage. Therefore, when applied to a wire harness, the waterproof structure for stopping water between bare wires of multiple circuits according to this embodiment makes it possible to reduce the size of a bump formed in a wire harness in accordance with the form of the container 30, for example, as well as preventing the interference between the bump and other members when laying out the wire harness.

Third Embodiment

Figure 6:
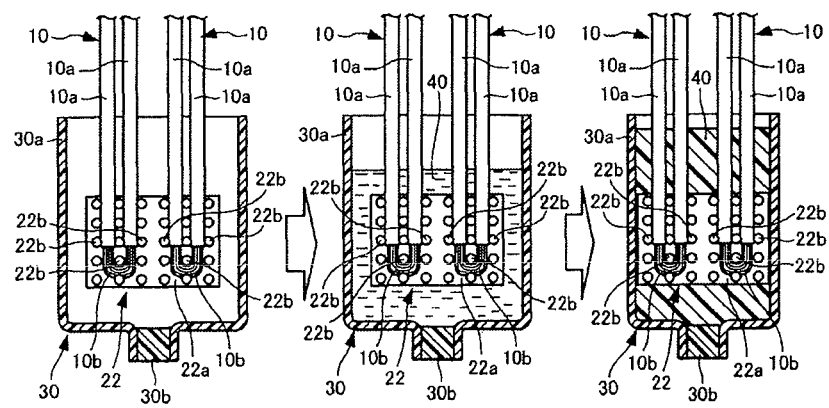
FIG. 6 is a schematic diagram showing a step of filling a thermosetting waterproofing agent into a container accommodating therein a wire support and intermediate parts in wire extending directions of a plurality of covered wires including stripped wire exposed parts and curing the same, in the waterproof structure for stopping water between bare wires of multiple circuits according to a third embodiment of the present invention.

As shown in FIG. 6, the waterproof structure for stopping water between bare wires of multiple circuits according to this embodiment is provided with the plurality of covered wires 10 constituting multiple circuits, the wire support 22 supporting each covered wire 10, the container 30 with a bottom which accommodates therein the wire support 22 and the predetermined portions of the plurality of covered wires 10, and the thermosetting waterproofing agent 40 filled into the container 30. The covered wire 10 and the container 30 have the same structures as those shown in FIG. 1, and will not be explained in detail.

Figure 7:
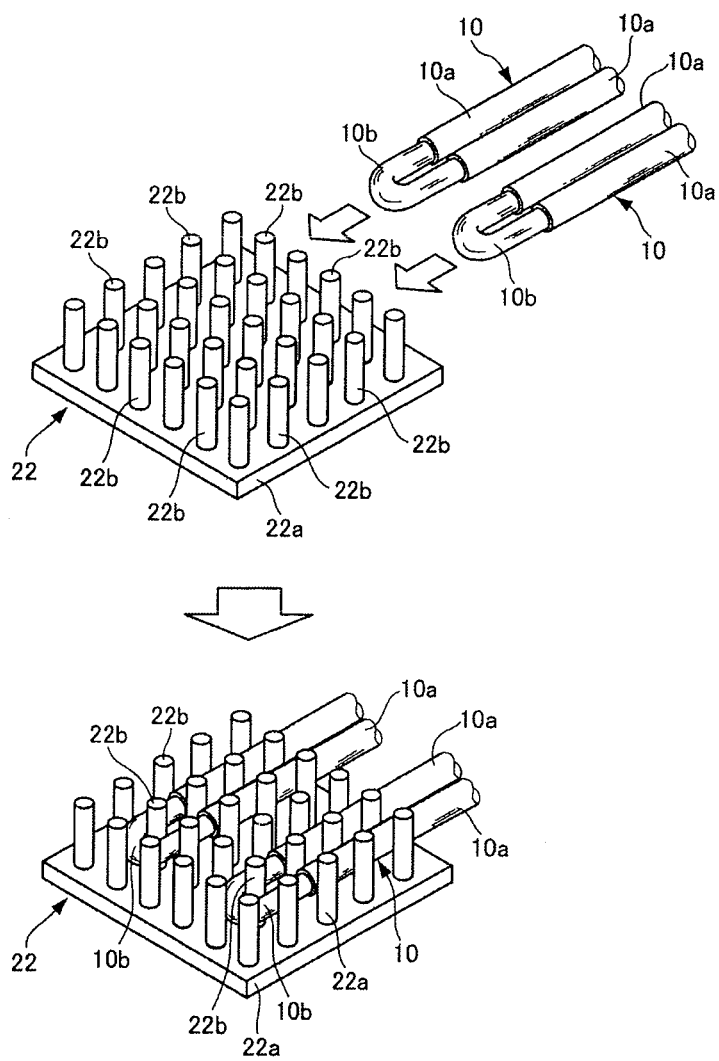
FIG. 7 is a schematic diagram showing a step of assembling a wire to the wire support, in the waterproof structure for stopping water between bare wires of multiple circuits according to the third embodiment of the present invention.

As shown in FIG. 7, the wire support 22 is made of a non-electrically conductive material, and provided with a planar plate part 22a and a multiple of rod-shaped hook parts 22b protruding from one side of the planar plate part 22a so as to be formed into a pinholder.

Each covered wire 10 is wound into a loop form and hooked to the hook part 22b of the wire support 22 so as to prevent short-circuits between the stripped wire exposed parts 10b, and clamped at the portions adjacent to the stripped wire exposed parts 10b in a wire radial direction with predetermined adjacent hook parts 22b of the wire support 22.

For the purpose of stopping water between bare wires of the plurality of covered wires 10 constituting multiple circuits, as shown in FIG. 7, the stripped wire exposed part 10b of each covered wire 10 is wound in a loop form and hooked to the hook part 22b of the wire support 22 so as to prevent short-circuits with each other. Each covered wire 10 is clamped at the portions adjacent to the stripped wire exposed parts 10b to predetermined adjacent hook parts 22b.

Then, as shown in FIG. 6, the wire support 22, the portions of the plurality of covered wires 10 supported by the wire support 22 and the stripped wire exposed parts 10b are accommodated within the container 30. At that time, the covered wires 10 are supported by a fixture or jig (not shown) outside of the container 30 to keep a predetermined interval between the interior bottom part of the container 30 and the lower end of the wire support 22.

Subsequently, an uncured thermosetting waterproofing agent 40 is filled into the container 30 so as to immerse the wire support 22, the portions of the plurality of covered wires 10 supported by the wire support 22 and the stripped wire exposed parts 10b, penetrating through the clearances between bare wires from the stripped wire exposed parts 10b of the plurality of covered wires 10 by capillary action.

Furthermore, the entire container 30 is heated up to a predetermined temperature to shrink its diameter by heat shrinkage, thermally curing the thermosetting waterproofing agent 40 filled into the container 30 and the thermosetting waterproofing agent 40 penetrating through the clearances between the bare wires of the covered wires 10.

In the waterproof structure for stopping water between bare wires of multiple circuits according to this embodiment, the thermosetting waterproofing agent 40 filled into the container 30 is cured while immersing the stripped wire exposed parts 10b of the plurality of covered wires 10 supported by the wire support 22 and penetrating through the clearances between bare wires of the covered wires 10 by capillary action. Therefore, the waterproof structure for stopping water between bare wires of multiple circuits according to this embodiment enables waterproofing between bare wires for all of the plurality of covered wires 10 constituting multiple circuits.

In the waterproof structure for stopping water between bare wires of multiple circuits according to this embodiment, the container 30 has a diameter that is overall shrunk by heat shrinkage. Therefore, when applied to a wire harness, the waterproof structure for stopping water between bare wires of multiple circuits according to this embodiment makes it possible to reduce the size of a bump formed in a wire harness in accordance with the form of the container 30, for example, as well as preventing the interference between the bump and other members when laying out the wire harness.

Fourth Embodiment

Figure 8:
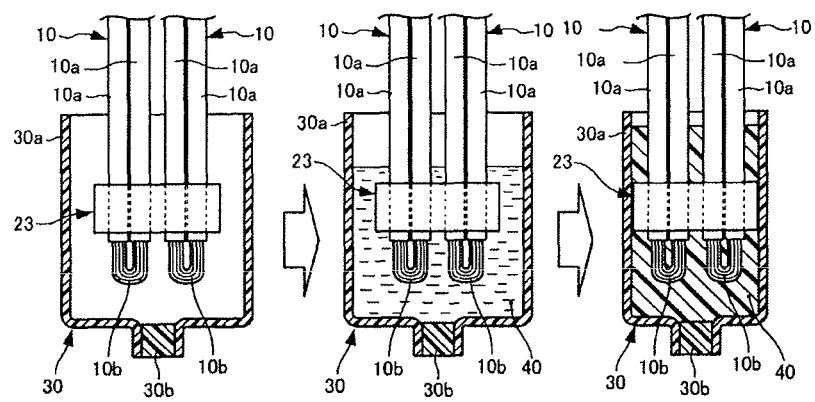
FIG. 8 is a schematic diagram showing a step of filling a thermosetting waterproofing agent into a container accommodating therein a wire support and intermediate parts in a wire extending direction of a plurality of covered wires including stripped wire exposed parts and curing the same, in the waterproof structure for stopping water between bare wires of multiple circuits according to a fourth embodiment of the present invention.

As shown in FIG. 8, the waterproof structure for stopping water between bare wires of multiple circuits according to this embodiment is provided with the plurality of covered wires 10 constituting multiple circuits, the wire support 23 supporting each covered wire 10, the container 30 with a bottom which accommodates therein the wire support 23 and predetermined portions of the plurality of covered wires 10, and a thermosetting waterproofing agent 40 filled into the container 30. The covered wire 10 and the container 30 have the same structures as those shown in FIG. 1, and will not be explained in detail.

Figure 9:
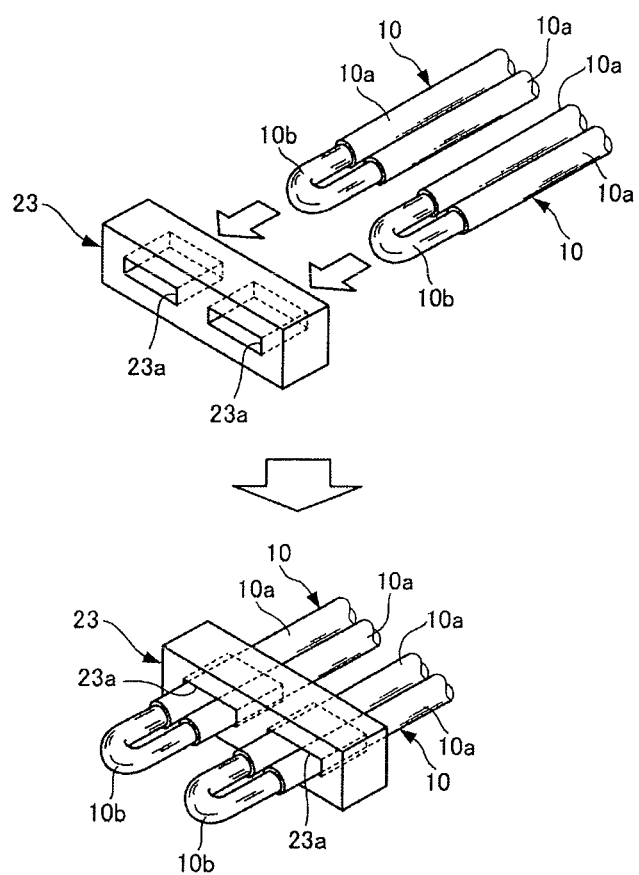
FIG. 9 is a schematic diagram showing a step of assembling a wire to the wire support, in the waterproof structure for stopping water between bare wires of multiple circuits according to the fourth embodiment of the present invention.
Figure 10:
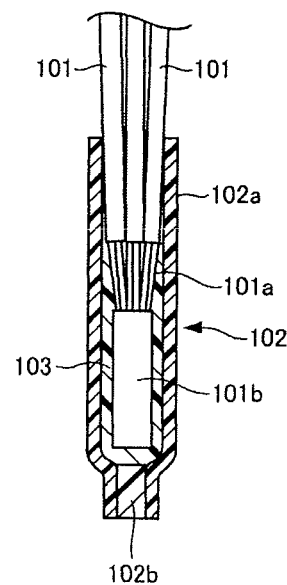
FIG. 10 is a schematic diagram showing a waterproofing structure of a conventional terminal splice part.

As shown in FIG. 9, the wire support 23 is made of a non-electrically conductive material, and provided with a wire insertion part 23a penetrating from one end to the other end.

Each covered wire 10 is inserted into the wire insertion part 23a of the wire support 23, and arranged to protrude outwardly from the wire support 23 so as to prevent short-circuits between the stripped wire exposed parts 10b. Each covered wire 10 is fixed at a portion covered with the cover material 10a to an inner circumferential part of the wire insertion part 23a by fitting.

For the purpose of stopping water between bare wires of a plurality of covered wires constituting multiple circuits, as shown in FIG. 9, each covered wire is inserted into the wire insertion part 23a of the wire support 23, and arranged to protrude outwardly from the wire support 23 so as to prevent short-circuits between the stripped wire exposed parts 10b.

Then, as shown in FIG. 8, the wire support 23, the portions of the plurality of covered wires 10 supported by the wire support 23 and the stripped wire exposed part 10b are accommodated within the container 30. At that time, the covered wires 10 are supported by a fixture or jig (not shown) outside of the container 30 to keep a predetermined interval between the interior bottom part of the container 30 and the lower end of the wire support 23.

Subsequently, an uncured thermosetting waterproofing agent 40 is filled into the container 30 so as to immerse the wire support 23, the portions of the plurality of covered wires 10 supported by the wire support 23 and the stripped wire exposed parts 10b, penetrating through the clearances between bare wires from the stripped wire exposed parts 10b of the plurality of covered wires 10 by capillary action.

Furthermore, the entire container 30 is heated up to a predetermined temperature to shrink its diameter by heat shrinkage, thermally curing the thermosetting waterproofing agent 40 filled into the container 30 and the thermosetting waterproofing agent 40 penetrating through the clearances between bare wires of the covered wires 10.

In the waterproof structure for stopping water between bare wires of multiple circuits according to this embodiment, the thermosetting waterproofing agent 40 filled into the container 30 is cured while penetrating through the clearances between bare wires of the covered wires 10 by capillary action from the stripped wire exposed parts 10b of the plurality of covered wires 10 supported by the wire support 23. Therefore, the waterproof structure for stopping water between bare wires of multiple circuits according to this embodiment enables waterproofing between bare wires for all of the plurality of covered wires 10 constituting multiple circuits.

In the waterproof structure for stopping water between bare wires of multiple circuits according to this embodiment, the container 30 has a diameter that is overall shrunk by heat shrinkage. Therefore, when applied to a wire harness, the waterproof structure for stopping water between bare wires of multiple circuits according to this embodiment makes it possible to reduce the size of a bump formed in a wire harness in accordance with the form of the container 30, for example, as well as preventing the interference between the bump and other members when laying out the wire harness.

The present invention is not limited to the above embodiments, and the technical scope of the present invention recited in the claims includes various design modifications without departing from the scope of the invention.

As described above, the waterproof structure for stopping water between bare wires according to the present invention allows for stopping water between bare wires all together for a plurality of covered wires constituting multiple circuits.

LIST OF REFERENCE NUMERALS

10: covered wire
10a: cover material
10b: bare wire exposed part
20, 21, 22, 23: wire support
30: container
30a: heat shrinkable tube
30b: stopper
40: thermosetting waterproofing agent

What is claimed is:

1. A waterproof structure for stopping water between bare wires of multiple circuits, the waterproof structure comprising:
  a plurality of covered wires each of which has a stripped wire exposed portion formed by removing a cover material in an intermediate portion thereof and is wound in a loop at the stripped wire exposed portion,
  a non-electrically conductive wire support which supports the plurality of covered wires so as to prevent short-circuits between the stripped wire exposed portions of the plurality of covered wires,
  a container which accommodates the wire support, portions of the plurality of covered wires supported by the wire support and the stripped wire exposed portions, and
  a thermosetting waterproofing agent which is filled into the container so as to immerse at least the stripped wire exposed portions of the plurality of covered wires and cured while penetrating through clearances between the bare wires from the stripped wire exposed portions of the plurality of covered wires,
  wherein the wire support is provided with a plurality of grooves extending in parallel and hooks protruding from bottom surfaces of the plurality of grooves, wherein the plurality of covered wires are inserted into the grooves of the wire support so as to prevent short-circuits between the stripped wire exposed portions, and wherein the stripped wire exposed portions are wound in a loop form and hooked to the hooks of the wire support.

2. The waterproof structure for stopping water between bare wires of multiple circuits according to claim 1, wherein the container is formed of a heat shrinkable tube having a closed end and heated to have a form with a shrunk diameter being filled with after the thermosetting waterproofing agent.

3. The waterproof structure for stopping water between bare wires of multiple circuits according to claim 1, wherein the container is formed of a heat shrinkable tube, the container accommodating a stopper at one end, the container being heated at the one end to shrink its diameter, closed with the stopper, filled with the thermosetting waterproofing agent, and heated to have a form with a shrunk diameter over the entire length.

4. The waterproof structure for stopping water between bare wires of multiple circuits according to claim 1, wherein the wire support is provided with a wire insertion part penetrating from one end to the other end, and wherein the plurality of covered wires are inserted into the wire insertion part of the wire support and protrude outwardly from the wire support so as to prevent short-circuits between the stripped wire exposed portions.

5. A waterproof structure for stopping water between bare wires of multiple circuits, the waterproof structure comprising:
  a plurality of covered wires each of which has a stripped wire exposed portion formed by removing a cover material in an intermediate portion thereof and is wound in a loop at the stripped wire exposed portion,
  a non-electrically conductive wire support which supports the plurality of covered wires so as to prevent short-circuits between the stripped wire exposed portions of the plurality of covered wires,
  a container which accommodates the wire support, portions of the plurality of covered wires supported by the wire support and the stripped wire exposed portions, and
  a thermosetting waterproofing agent which is filled into the container so as to immerse at least the stripped wire exposed portions of the plurality of covered wires and cured while penetrating through clearances between the bare wires from the stripped wire exposed portions of the plurality of covered wires,
  wherein the wire support is provided with a tubular part and a plurality of hooks which are spaced apart from each other at a predetermined interval in a longitudinal direction of the tubular part and protrude radially outwardly in a radial direction from the tubular part, and wherein the plurality of covered wires are wound at the stripped wire exposed portions in loop forms and hooked to the tubular part of the wire support, and supported by the hooks of the wire support so as to prevent short-circuits between the stripped wire exposed portions.

6. A waterproof structure for stopping water between bare wires of multiple circuits, the waterproof structure comprising:
   a plurality of covered wires each of which has a stripped wire exposed portion formed by removing a cover material in an intermediate portion thereof and is wound in a loop at the stripped wire exposed portion,
   a non-electrically conductive wire support which supports the plurality of covered wires so as to prevent short-circuits between the stripped wire exposed portions of the plurality of covered wires,
   a container which accommodates the wire support, portions of the plurality of covered wires supported by the wire support and the stripped wire exposed portions, and
a thermosetting waterproofing agent which is filled into the container so as to immerse at least the stripped wire exposed portions of the plurality of covered wires and cured while penetrating through clearances between the bare wires from the stripped wire exposed portions of the plurality of covered wires,
   wherein the wire support is provided with a planar plate and a plurality of hooks protruding from one side of the planar plate so as to be formed into a pinholder shape, and
   wherein the plurality of covered wires are wound in loop forms and hooked to the hooks of the wire support so as to prevent short-circuits between the stripped wire exposed portions and clamped at portions adjacent to the stripped wire exposed portions with the predetermined adjacent hooks in a radial direction of the wire.

7. A waterproof structure for stopping water between bare wires of multiple circuits, the waterproof structure comprising:
   a plurality of covered wires each of which has a stripped wire exposed portion formed by removing a cover material in an intermediate portion thereof and is folded over at the stripped wire exposed portion,
   a non-electrically conductive wire support which supports the plurality of covered wires so as to prevent short-circuits between the stripped wire exposed portions of the plurality of covered wires,
   a container which accommodates the wire support, portions of the plurality of covered wires supported by the wire support and the stripped wire exposed portions, and
a thermosetting waterproofing agent which is filled into the container so as to immerse at least the stripped wire exposed portions of the plurality of covered wires and cured while penetrating through clearances between the bare wires from the stripped wire exposed portions of the plurality of covered wires,
   wherein the wire support is provided with a tubular part and a plurality of hooks which are spaced apart from each other at a predetermined interval in a longitudinal direction of the tubular part and protrude radially outwardly in a radial direction from the tubular part, and wherein the plurality of covered wires are wound at the stripped wire exposed portions in loop forms and hooked to the tubular part of the wire support, and supported by the hooks of the wire support so as to prevent short-circuits between the stripped wire exposed portions.

8. A waterproof structure for stopping water between bare wires of multiple circuits, the waterproof structure comprising:
   a plurality of covered wires each of which has a stripped wire exposed portion formed by removing a cover material in an intermediate portion thereof and is folded over at the stripped wire exposed portion,
   a non-electrically conductive wire support which supports the plurality of covered wires so as to prevent short-circuits between the stripped wire exposed portions of the plurality of covered wires,
   a container which accommodates the wire support, portions of the plurality of covered wires supported by the wire support and the stripped wire exposed portions, and
a thermosetting waterproofing agent which is filled into the container so as to immerse at least the stripped wire exposed portions of the plurality of covered wires and cured while penetrating through clearances between the bare wires from the stripped wire exposed portions of the plurality of covered wires,
   wherein the wire support is provided with a plurality of grooves extending in parallel and hooks protruding from bottom surfaces of the plurality of grooves, wherein the plurality of covered wires are inserted into the grooves of the wire support so as to prevent short-circuits between the stripped wire exposed portions, and wherein the stripped wire exposed portions are wound in a loop form and hooked to the hooks of the wire support.

9. A waterproof structure for stopping water between bare wires of multiple circuits, the waterproof structure comprising:
   a plurality of covered wires each of which has a stripped wire exposed portion formed by removing a cover material in an intermediate portion thereof and is folded over at the stripped wire exposed portion,
   a non-electrically conductive wire support which supports the plurality of covered wires so as to prevent short-circuits between the stripped wire exposed portions of the plurality of covered wires,
   a container which accommodates the wire support, portions of the plurality of covered wires supported by the wire support and the stripped wire exposed portions, and
a thermosetting waterproofing agent which is filled into the container so as to immerse at least the stripped wire exposed portions of the plurality of covered wires and cured while penetrating through clearances between the bare wires from the stripped wire exposed portions of the plurality of covered wires,
   wherein the wire support is provided with a planar plate and a plurality of hooks protruding from one side of the planar plate so as to be formed into a pinholder shape, and
   wherein the plurality of covered wires are wound in loop forms and hooked to the hooks of the wire support so as to prevent short-circuits between the stripped wire exposed portions and clamped at portions adjacent to the stripped wire exposed portions with the predetermined adjacent hooks in a radial direction of the wire.

* * * * *